US007618489B2

(12) United States Patent
Kuo et al.

(10) Patent No.: US 7,618,489 B2
(45) Date of Patent: Nov. 17, 2009

(54) COMPOSITIONS AND METHOD FOR SURFACE TREATMENT OF PIGMENTS

(75) Inventors: Ping-Lin Kuo, Kaohsiung Hsien (TW); Hsu-Hui Lin, Kaohsiung (TW)

(73) Assignee: Yung Chi Paint & Varnish Mfg. Co., Ltd., Kaohsiung (TW)

( * ) Notice: Subject to any disclaimer, the term of this patent is extended or adjusted under 35 U.S.C. 154(b) by 0 days.

(21) Appl. No.: 10/820,345

(22) Filed: Apr. 7, 2004

(65) Prior Publication Data

US 2005/0228078 A1 Oct. 13, 2005

(51) Int. Cl.
*C08K 5/00* (2006.01)
*C08G 59/50* (2006.01)
*C08L 63/00* (2006.01)

(52) U.S. Cl. .................................... 106/499; 523/400

(58) Field of Classification Search ................ 106/499; 523/400

See application file for complete search history.

(56) References Cited

U.S. PATENT DOCUMENTS

| | | | | |
|---|---|---|---|---|
| 3,326,827 | A * | 6/1967 | Mullin | 523/205 |
| 3,988,288 | A * | 10/1976 | Yamauchi et al. | 523/436 |
| 4,452,929 | A * | 6/1984 | Powers et al. | 523/403 |
| 5,719,206 | A | 2/1998 | Iibuchi et al. | |
| 5,747,599 | A * | 5/1998 | Ohnishi | 525/327.3 |
| 5,969,048 | A | 10/1999 | Fujita et al. | |
| 6,120,596 | A | 9/2000 | Yoshikazu | |
| 6,500,593 | B2 * | 12/2002 | Abe et al. | 430/108.22 |
| 6,548,174 | B2 | 4/2003 | Kamimori et al. | |
| 6,635,341 | B1 * | 10/2003 | Barancyk et al. | 428/323 |

FOREIGN PATENT DOCUMENTS

| | | | |
|---|---|---|---|
| JP | 04-220465 | * | 8/1992 |
| JP | 5-5320533 | | 12/1993 |
| JP | 7-331102 | | 12/1995 |
| JP | 2005-343960 | * | 12/2005 |

* cited by examiner

*Primary Examiner*—Patricia L Hailey
(74) *Attorney, Agent, or Firm*—Merchant & Gould P.C.

(57) ABSTRACT

Pigment particles are treated with an epoxy compound having a general formula (I):

$$\overset{O}{\widehat{CR^1R^2-CR^3}}-CR^4R^5-R^6$$

wherein $R^1$, $R^2$, $R^3$, $R^4$ and $R^5$ are each, independently, hydrogen, or substituted or unsubstituted alkyl, or $R^2$ and $R^4$ may be taken together to form a 5-7 membered ring, and $R^6$ is hydrogen, —$OOCR^7$, —$OR^8$, —OOC—$CR^9$=$CR^{10}R^{11}$, monoepoxy or polyepoxy group containing diphenyl, phenyl, or substituted or unsubstituted alkyl or cycloalkyl, or monoepoxy or polyepoxy group containing a polyether group, $R^7$, $R^8$, $R^{10}$ and $R^{11}$ are each, independently, hydrogen, substituted or unsubstituted alkyl, substituted or unsubstituted cycloalkyl, substituted or unsubstituted aryl, and substituted or unsubstituted alkenyl, and $R^9$ is hydrogen, or alkyl, with the proviso that the epoxy compound has no silicon-containing group.

20 Claims, No Drawings

COMPOSITIONS AND METHOD FOR SURFACE TREATMENT OF PIGMENTS

BACKGROUND OF THE INVENTION

1. Field of the Invention

This invention relates to a pigment composition, more particularly to a surface-treated pigment composition, a surface-treated pigment dispersion and a method of treating pigment particles.

2. Description of the Related Art

It is known in the art to surface treat pigment particles in order to improve the dispersing properties of the pigment particles in a liquid such as a binder resin or polymer solution. There are methods which utilize high molecular weight polymers to treat the surface of pigment particles by forming a coating on the surface of pigment particles. An example of the high molecular polymer dispersing agent is disclosed in JP 5320533. Generally, the high molecular weight polymers are attached to the surface of pigment particles via adsorption.

U.S. Pat. No. 6,548,174 B2 discloses a pigment dispersing resin having a weight average molecular weight within a range of 5000-100,000 which is obtained by copolymerizing a macromonomer with an ethylenically unsaturated monomer. Preparation of a macromonomer is necessary to produce such a high molecular polymer dispersing resin. This patent discloses an epoxy-containing polymerizable unsaturated monomer, such as glycidyl methacrylate, for use in preparing the macromonomer.

U.S. Pat. No. 5,969,048 discloses a colored coating composition which comprises (a) a polymer having a carboxyl group and a carboxylate group, (b) a polymer having a hydroxyl group and an epoxy group, (c) a pigment-dispersing agent, and (d) a pigment. The polymer (b) disclosed therein is a high molecular weight copolymer which is prepared by copolymerizing an epoxy group-containing ethylenically unsaturated monomer with a hydroxyl group-containing ethylenically unsaturated monomer and the other copolymerizable ethylenically unsaturated monomer.

Surface-treatment agents containing silicon, such as silylating, or silane coupling agents are generally attached to the surface of pigment particles through a chemical bond. For example, Japanese Publication No. JP 7-331102 discloses a method of treating an organic pigment with a silylating or silane coupling agent. An example of the silylating agents disclosed therein is glycidoxypropyl-trimethoxysilane which includes an epoxy group.

U.S. Pat. No. 6,120,596 discloses a method of treating pigment particles by contacting a dispersion of pigment particles with halosilane or organohalosilane, elevating the temperature to form a siloxane on the surface of the particles, and recovering the surface treated particles as a presscake or as dry particles.

U.S. Pat. No. 5,719,206 discloses an aqueous coating composition which includes an inorganic particulate substance whose surface is modified with a silane coupling agent having at least one functional group selected from a group consisting of a vinyl group, a methacryloyl group, epoxy group, and an amino group; and a water-dispersible resin having a functional group which is reactive with a functional group of the silane coupling agent. In an example of said patent, glycidoxypropyl-trimethoxysilane is used as the silane coupling agent having an epoxy group.

While the silicon-containing surface-treating agents such as alkoxysilanes provide the treated pigments with improved physical properties, such as high heat and chemical resistance, good dispersing ability, good weather resistance, etc., however physical properties of the film resulted from the dispersions of such treated pigment particles are unsatisfactory because of insufficient compatibility of the treated particles to a binder resin due to the presence of silicon.

Conventionally, a color filter for a flat display includes a coloring layer formed from a composition containing a pigment dispersed in a binder. In order to provide a color filter with good light transmittance characteristics, it is desirable to provide a pigment composition which has an excellent pigment dispersing property, small pigment particle size, high dispersion stability and good compatibility among the components contained in the composition.

SUMMARY OF THE INVENTION

An object of the present invention is to provide a pigment composition in which pigment particles are treated with a compound which contains no silicon so that compatibility of pigment particles to the components, especially the binder resin contained in a color resist, can be improved, and film properties such as transparency, can be enhanced.

Another object of the present invention is to provide a method of treating pigment particles by using a low molecular-weight silicon-free compound, instead of high molecular weight polymers for treating pigment particles, to thereby form a thin layer on the pigment surface thereof, whereby a pigment composition which can be dispersed with a dispersant into a small particle size to exhibit excellent flowability, especially low viscosity and low Ti (thixotropic index), can be produced. In addition, with the present invention, the amount of a dispersant required to disperse a pigment is reduced so that the heat-resistance (expressed in terms of ΔEab) of a film resulting from the pigment composition can be enhanced.

According to one aspect of the present invention, a pigment composition comprises pigment particles, and an epoxy compound for surface treating the pigment particles, which has a general formula:

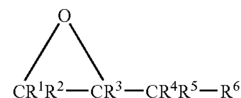

wherein $R^1$, $R^2$, $R^3$, $R^4$ and $R^5$ are each, independently, hydrogen, or substituted or unsubstituted alkyl, or $R^2$ and $R^4$ may be taken together to form a 5-7 membered ring, and $R^6$ is hydrogen, —OOCR$^7$, —OR$^8$, —OOC—CR$^9$═CR$^{10}$R$^{11}$, monoepoxy or polyepoxy group containing diphenyl, phenyl, or substituted or unsubstituted alkyl or cycloalkyl, or monoepoxy or polyepoxy group containing a polyether group, $R^7$, $R^8$, $R^{10}$ and $R^{11}$ are each, independently, hydrogen, substituted or unsubstituted alkyl, substituted or unsubstituted cycloalkyl, substituted or unsubstituted aryl, substituted or unsubstituted alkenyl, $R^9$ is hydrogen, and alkyl, with the proviso that the epoxy compound has no silicon-containing group.

According to another aspect of the present invention, a pigment dispersion comprises a dispersing agent, and pigment particles dispersed in the dispersing agent, wherein the pigment particles have been treated with an epoxy compound having the general formula (I).

According to a further aspect of the present invention, a method of surface treating pigment particles comprises: mixing the pigment particles with an epoxy compound in the presence of a solvent to form a slurry; and causing the pigment particles to react with the epoxy compound at an elevated temperature, wherein the epoxy compound has the general formula (I). The method may further include the step of removing the solvent from the slurry to thereby dry the surface-treated pigment particles.

DETAILED DESCRIPTION OF THE PREFERRED EMBODIMENTS

In the present invention, low molecular weight epoxy compounds are used to react with the surface of pigment particles. The epoxy compounds used in the present invention are mainly commercially available organic compounds which mostly have a molecular structure that has an epoxy equivalent weight of less than 1000. When pigment particles are treated with a low molecular weight epoxy compound at an elevated temperature, they react with the epoxy compound, and a layer of coating is formed on the surface of the pigment particles through physical and/or chemical bonds.

The low molecular weight epoxy compounds suitable for treating pigment particles according to the present invention may include, singly or in combination, conventional epoxy compounds which have an epoxy equivalent weight of less than 1000. Preferred compounds are monoglycidyl or polyglycidyl ethers and monoglycidyl or polyglycidyl esters. Particularly, the epoxy compounds suitable for the present invention may include: monoepoxy compounds, such as aliphatic glycidyl esters, cycloaliphatic glycidyl esters, aromatic glycidyl esters, aliphatic glycidyl ethers, cycloaliphatic glycidyl ethers, aromatic glycidyl ethers, aliphatic, cycloaliphatic or aromatic glycidyl acrylates, or other suitable monoepoxy compounds; and diepoxy or polyepoxy compounds which are conventionally used as epoxy resins and which contain substituted or unsubstituted alkyl or cycloalkyl, an aliphatic group, monophenolic group, diphenolic group, or a polyether group, and other suitable polyepoxy compounds.

Examples of the aforesaid epoxy compounds are ethers, such as 2-ethylhexyl glycidyl ether, butyl glycidyl ether, decylglycidyl ether, phenyl glycidyl ether, cresyl glycidyl ether, p-tert butyl phenyl glycidyl ether, 1,4-butanediol diglycidyl ether, neopentylglycol diglycidyl ether, trimethylol propane triglycidyl ether, bis-2,3-epoxycyclopentyl glycidyl ether, 1,4-bis(hydroxymethyl)cyclohexane diglycidyl ether, and monoglycidyl or polyglycidyl ethers of monophenolic or diphenolic compounds, etc., glycidyl phenolic epoxy resins, cycloaliphatic epoxy compounds such as cyclohexene oxide, and cyclopentene oxide, esters such as glycidyl ethanoate, glycidyl propanoate, glycidyl butyrate, glycidyl valerate, glycidyl decanoate, glycidyl undecanoate, glycidyl dodecanoate, 3,4-epoxycyclohexyl methyl-3',4'-epoxy-4-cyclohexyl carboxylate, diglycidyl 1,2-cyclohexane dicarboxylate, etc., and other epoxy compounds, such as triglycidyl isocyanurate, glycidyl methacrylate, 3,4-epoxycyclohexyl(meth)acrylate and other acrylate monomers containing an epoxy group.

The pigments which can be surface-treated according to the present invention may be organic or inorganic pigments. The present invention is particularly suitable for pigments used in making color filters. Examples of the pigments are pigment blue (PB15:6), pigment red PR254 (diketopyrrolo pyrrole), pigment yellow PY138 (quinophthalone), pigment yellow PY139 (isoindolinone), pigment green PG36 (copper phthalocyanine), silica, fumed silica, etc.

Solvents for dispersing the pigments used in the process of treating the pigments with the epoxy compounds in the present invention may be any known solvents which are used conventionally to disperse the pigment particles. Examples of such solvents include toluene, xylene, cyclohexanone, and propylene glycol monomethyl ether acetate (PMA).

The following examples are provided for purposes of illustrating the invention and should not be construed in any manner to limit the scope of the invention, which is defined by the appended claims.

EXAMPLE (1)

12.0 parts by weight of pigment blue (PB15:6) was mixed with 80.8 parts by weight of a solvent (toluene) in a mixer. After mixing for two hours, 7.2 parts by weight of 2-ethylhexyl glycidyl ether (2-EHGE) was added gradually to the mixer until it was dispersed completely. Then, silica-zirconia beads having a dimension of about 0.3-0.4 mm were added to the mixer to grind the resulting mixture to a particle size of about 90 nm. The resulting slurry was heated to a reflux temperature to undergo reaction. After 4 hours, the solvent was removed under vacuum in Rotavapor for drying, and the dried residue was ground to form a powder.

EXAMPLE (2)

6.0 parts by weight of butyl glycidyl ether (BGE), 15.0 parts by weight of pigment green (PG36), and 79 parts by weight of xylene (solvent) were mixed for 2 hours using an agitator until the pigment was dispersed completely. The mixture was then milled to a particle size of 130 nm using silica-zirconia beads having a diameter of about 0.3-0.4 mm. The resulting slurry was heated to 90° C. to undergo reaction for 8 hours, and was then dried under vacuum in Rotavapor to concentrate the slurry. The slurry was finally dried and ground to form a powder.

EXAMPLE (3)

1.5 parts by weight of glycidyl aliphatic ester, 10 parts by weight of pigment BTCF(PR254) and 88.5 parts by weight of toluene were mixed in a mixer for 2 hours until the pigment was completely dispersed. Then, the mixture was ground to a particle size of about 150 nm using silica-zirconia beads having a diameter of about 0.3-0.4 mm. After a reaction at a temperature of 90° C. for 6 hrs followed by drying under vacuum in Rotavapor to remove the solvent, the dried residue was ground into a powdered form.

EXAMPLE (4)

20 parts by weight of pigment 2RCF(PY139), 65.5 parts by weight of toluene, and 10 parts by weight of propylene glycol monomethyl ether acetate (PMA) were mixed in a mixer until the pigment was dispersed completely. Then, the mixture was ground to a desired particle size, and 4.5 parts by weight of decyl glycidyl ether (DGE) was added thereto gradually. After the resulting mixture was heated to undergo a reaction for 6 hours at a temperature of about 90° C., the pressure thereof was reduced to 20 mmHg by means of Rotavapor. The concentrated and dried residue was ground into a powdered form.

EXAMPLE (5)

12 parts by weight of pigment yellow (PY138), 65 parts by weight of toluene, 20 parts by weight of cyclohexanone were mixed in a mixer for 2 hrs and were thereafter milled using silica-zirconia beads having a diameter of about 0.3-0.4 mm to provide a particle size of about 130 nm. To the mixture was added 3 parts by weight of glycidyl methyl methacrylate (GMA). After a reaction at a temperature of 90° C. for 6 hours followed by reducing the pressure to 20 mmHg by means of Rotavapor, the concentrated and dried residue was ground into a powder.

EXAMPLE (6)

20 parts by weight of the powder produced in each of examples 1-5 was mixed with 9.0 parts by weight of a dispersant (Disperbyk 163 manufactured by Byk-Chemie) and 71 parts by weight of propylene glycol mono methyl ether acetate (PMA) followed by grinding to form a dispersion. The viscosity values, average particle sizes, and Ti values (thixotropic index) of the resulting dispersions of the powders produced in Examples 1-5 are shown in Table 1.

COMPARATIVE EXAMPLES 1-5

Comparative Examples 1-5 were carried out in the same manner as Examples 1-6 except that the epoxy compounds used to treat the pigments in Example 1-5 were omitted in the comparative examples. The viscosity values, average particle sizes and Ti values (thixotropic index) of the dispersions of comparative examples 1-5 are shown in Table 2.

TABLE (1)

| Examples | Viscosity (cps) | Ti | Particle size (nm) | Viscosity 50° C. 7 days |
|---|---|---|---|---|
| 1 | 8.1 | 1.13 | 121.7 | 9.5 |
| 2 | 13.8 | 1.18 | 127.1 | 15.1 |
| 3 | 8.6 | 1.26 | 115.8 | 9.1 |
| 4 | 6.6 | 1.08 | 105.3 | 7.6 |
| 5 | 15.1 | 1.1 | 127.5 | 18.2 |

TABLE (2)

| Comparative examples | Viscosity (cps) | Ti | Particle size (nm) | Viscosity 50° C. 7 days |
|---|---|---|---|---|
| 1 | 46.5 | 1.47 | 278.1 | >50.0 |
| 2 | 33.7 | 1.41 | 281.1 | >50.0 |
| 3 | 28.8 | 1.56 | 251.8 | >50.0 |
| 4 | 38.7 | 1.45 | 212.5 | 250.0 |
| 5 | 41.7 | 1.61 | 241.3 | >50.0 |

Tables (1) and (2) show that, compared to comparative examples 1 to 5, examples 1 to 5 according to the present invention exhibit lower viscosity values and smaller particle sizes. After storage for over 7 days at a high temperature (50° C.), it was observed that the changes in viscosity and particle size of Examples 1 to 5 are small compared to that of comparative examples 1 to 5. This reveals that the storage stability of examples 1 to 5 is better than that of Comparative Examples 1-5. The Ti values (thixotropic index) of Examples 1 to 5 in Tables (1) are lower than the Ti values shown in Table (2) and are close to that of the Newtonion rheology. This shows that the dispersions of Examples 1 to 5 have good flow properties.

EXAMPLES 7 AND 8

Following the procedure of example 6, pigment dispersions containing 20% and 30% of a dispersant (Disperbyk 163) was prepared by using the pigment green which had been surface-treated in Example 2. The viscosities, average particle sizes, and chromaticity levels of the resulting pigment dispersions are shown in Table 3.

COMPARATIVE EXAMPLES 7, 8 AND 9

Following the procedure of example 6, pigment dispersions containing 20%, 30% and 50% of a dispersant (Disperbyk 163) were prepared by using pigment green which had not been surface treated. The viscosities, average particle sizes, and chromaticity levels of the resulting pigment dispersions are shown in Table 3.

TABLE 3

| | Dispersant % | cps | Size (nm) | Y | x | y | ΔEab |
|---|---|---|---|---|---|---|---|
| Example 7 | 20 | 14.1 | 127.1 | 63.91 | 0.2488 | 0.4291 | 0.8 |
| Example 8 | 30 | 8.0 | 122.8 | 64.35 | 0.2494 | 0.4302 | 0.8 |
| Comparative Example 7 | 20 | >50 | 281.5 | 60.12 | 0.2487 | 0.4291 | 1.1 |
| Comparative Example 8 | 30 | 31.2 | 221.8 | 61.31 | 0.2486 | 0.4296 | 1.1 |
| Comparative Example 9 | 50 | 10.1 | 125.6 | 63.65 | 0.2498 | 0.4299 | 2.3 |

Table 3 shows that, while Comparative Examples 7 and 8 contain the same amount of dispersant as Examples 7 and 8, respectively, they have higher viscosities and greater average particle sizes compared to Examples 7 and 8. From a comparison of Example 8 with Comparative Example 9, it can be seen that the untreated pigment requires a higher amount of dispersant (up to 50%) in order to lower the viscosity and the average particle size to a level close to that of Example 8. This reveals that the amount of dispersant required to disperse the pigment is reduced after the pigment is surface treated according to the present invention.

The heat resistance property of each of Examples 7 and 8 and Comparative Examples 7, 8 and 9 is shown in terms of color difference (ΔEab) which was determined by using a color meter (MCPD manufactured by Otsuka Electronic Co., Ltd.) to examine a color change of each dispersion before and after heating. The lower the ΔEab value, the higher the heat resistance. Table (3) shows that the heat resistance of Example 7 or 8 (ΔEab=0.8) is higher than that of Comparative Examples 7, 8 and 9. This also reveals that the thermal stability of Example 7 or 8 is better than that of Comparative Examples 7, 8 and 9.

The compatibility of each of Examples 7 and 8, and Comparative Examples 7, 8 and 9 is represented by the values of Y, x, y which were also determined using a color meter (MCPD). The higher the Y value, the higher the light transmittance. When the light transmittance is high, the compatibility of the components in the dispersion is good. Table (3) shows that the surface-treated pigment used in Examples 7 and 8 have better compatibility to the dispersant compared with the untreated pigment used in Comparative Examples 7, 8 and 9.

We claim:

1. A pigment comprising pigment particles reacted with an epoxy compound at an elevated temperature in the presence of a solvent for dispersing the pigments wherein a discrete powder form of the surface treated pigment particles can be obtained by virtue of drying of the solvent so as to provide a surface treatment of the particle, the epoxy compound having a general formula:

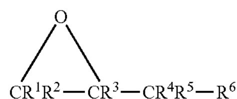

wherein $R^1$, $R^2$, $R^3$, $R^4$ and $R^5$ are each, independently, hydrogen, or substituted or unsubstituted alkyl, or, $R^2$ and $^4$ may be taken together to form a 5-7 membered ring, and $R^6$ is hydrogen, —$OOCR^7$, —$OR^8$, —OOC—$CR^9$=$CR^{10}R^{11}$, a monoepoxy or polyepoxy group containing diphenyl, phenyl, or substituted or unsubstituted alkyl or cycloalkyl, or a monoepoxy or polyepoxy group containing a polyether group, $R^7$, $R^8$, $R^{10}$ and $R^{11}$ are each, independently, hydrogen, substituted or unsubstituted alkyl, substituted or unsubstituted aryl, or substituted or unsubstituted alkenyl, $R^9$ is hydrogen, or alkyl, with the proviso that the epoxy compound has no silicon-containing group.

2. The pigment as claimed in claim 1, wherein the epoxy compound has an epoxy equivalent weight of less than 1000.

3. The pigment as claimed in claim 1, wherein the epoxy compound is selected from a group consisting of glycidyl ethers, glycidyl esters, cycloaliphatic epoxy compounds, and cycloaliphatic diepoxy compounds.

4. The pigment as claimed in claim 1, wherein the epoxy compound is selected from a group consisting of glycidyl methacrylates and glycidyl acrylates.

5. A pigment dispersion comprising:

a dispersing agent, and a pigment dispersed in the dispersing agent, wherein particles of the pigment are reacted with an epoxy compound at an elevated temperature in the presence of a solvent to provide a surface treatment of the particles, wherein a discrete powder form of the surface treated pigment particles can be obtained by virtue of drying of the solvent, the epoxy compound having a general formula:

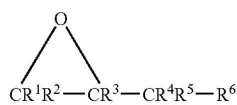

wherein $R^1$, $R^2$, $R^3$, $R^4$ and $R^5$ are each, independently, hydrogen, or substituted or unsubstituted alkyl, or $R^2$and $R^4$ may be taken together to form a 5-7 membered ring, and $R^6$ is hydrogen, —$OOCR^7$, —$OR^8$, —OOC—$CR^9$=$CR^{10}R^{11}$, a monoepoxy or polyepoxy group containing diphenyl, phenyl, or substituted or unsubstituted alkyl or cycloalkyl, or a monoepoxy or polyepoxy group containing a polyether group, $R^7$, $R^8$, $R^{10}$ and $R^{11}$ are each, independently, hydrogen, substituted or unsubstituted alkyl, substituted or unsubstituted aryl, or substituted or unsubstituted alkenyl, $R^9$ is hydrogen, or alkyl, with the proviso that the epoxy compound has no silicon-containing group.

6. The pigment dispersion as claimed in claim 5, wherein the epoxy compound has an epoxy equivalent weight of less than 1000.

7. The pigment dispersion as claimed in claim 5, wherein the epoxy compound is selected from group consisting of glycidyl ethers, glycidyl esters, cycloaliphatic epoxy compounds, and cycloaliphatic diepoxy compounds.

8. The pigment dispersion as claimed in claim 5, wherein the epoxy compound is selected from a group consisting of glycidyl methacrylates and glycidyl acrylates.

9. A method of surface treating pigment particles, comprising:

mixing the pigment particles with an epoxy compound in the presence of a solvent to form a slurry; and causing the pigment particles to react with the epoxy compound by heating the slurry, wherein a discrete powder form of the surface treated pigment particles can be obtained by virtue of drying of the solvent, wherein the epoxy compound has a general formula

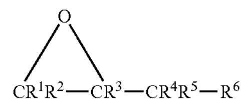

wherein $R^1$, $R^2$, $R^3$, $R^4$ and $R^5$ are each, independently, hydrogen, or substituted or unsubstituted alkyl, or $R^2$ and $R^4$ may be taken together to form a 5-7 membered ring, and $R^6$ is hydrogen, —$OOCR^7$, —$OR^8$, —OOC—$CR^9$=$CR^{10}R^{11}$, a monoepoxy or polyepoxy group containing diphenyl, phenyl, or substituted or unsubstituted alkyl or cycloalkyl, or a monoepoxy or polyepoxy group containing a polyether group, $R^7$, $R^8$, $R^{10}$ and $R^{11}$ are each, independently, hydrogen, substituted or unsubstituted alkyl, substituted or unsubstituted aryl, or substituted or unsubstituted alkenyl, $R^9$ is hydrogen, or alkyl, with the proviso that the epoxy compound has no silicon-containing group.

10. The method as claimed in claim 9, wherein the epoxy compound has an epoxy equivalent weight of less than 1000.

11. The method as claimed in claim 9, wherein the epoxy compound is selected from a group consisting of glycidyl ethers, glycidyl esters, cycloaliphatic epoxy compounds, and cycloaliphatic diepoxy compounds.

12. The method as claimed in claim 9, wherein the epoxy compound is selected from a group consisting of glycidyl methacrylates and glycidyl acrylates.

13. The method as claimed in claim 9, further comprising the step of removing the solvent and drying the pigment particles treated with the epoxy compound.

14. The pigment of claim 1 wherein the reaction of pigment particles with the epoxy compound forms a thin layer on the pigment surface.

15. The method of surface treating pigment particles according to claim 9 wherein the reaction of pigment particles with the epoxy compound forms a thin layer on the pigment surface.

16. A pigment comprising pigment particles reacted with an epoxy compound in the presence of a solvent for dispersing the pigments to provide a surface treatment of the particles wherein the epoxy compound forms a discrete layer on the pigment surface, the epoxy compound having a general formula:

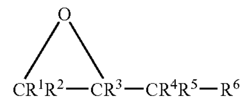

wherein $R^1$, $R^2$, $R^3$, $R^4$ and $R^5$ are each, independently, hydrogen, or substituted or unsubstituted alkyl, or, $R^2$ and $R^4$ may be taken together to form a 5-7 membered ring, and $R^6$ is hydrogen, —OOCR$^7$, —OR$^8$, —OOC—CR$^9$═CR$^{10}$R$^{11}$, a monoepoxy or polyepoxy group containing diphenyl, phenyl, or substituted or unsubstituted alkyl or cycloalkyl, or a monoepoxy or polyepoxy group containing a polyether group, $R^7$, $R^8$, $R^{10}$ and $R^{11}$ are each, independently, hydrogen, substituted or unsubstituted alkyl, substituted or unsubstituted aryl, or substituted or unsubstituted alkenyl, $R^9$ is hydrogen, or alkyl, with the proviso that the epoxy compound has no silicon-containing group.

17. The pigment of claim 16, wherein the epoxy compound has an epoxy equivalent weight of less than 1000.

18. The pigment of claim 16, wherein the epoxy compound is selected from a group consisting of glycidyl ethers, glycidyl esters, cycloaliphatic epoxy compounds, and cycloaliphatic diepoxy compounds.

19. The pigment of claim 16, wherein the epoxy compound is selected from a group consisting of glycidyl methacrylates and glycidyl acrylates.

20. The pigment of claim 16 wherein the reaction of pigment particles with the epoxy compound forms a thin layer on the pigment surface.

* * * * *